United States Patent [19]

Wertepny et al.

[11] 4,204,331
[45] May 27, 1980

[54] KEYWAY GAUGE

[76] Inventors: Stanley A. Wertepny, 715 Elizabeth Ln.; Alexander W. Wertepny, 2063 Craig Dr., both of Des Plaines, Ill. 60018

[21] Appl. No.: 901,320

[22] Filed: May 1, 1978

[51] Int. Cl.² .............................................. G01B 3/22
[52] U.S. Cl. .................. 33/172 R; 33/147 J; 33/170
[58] Field of Search ............ 33/172 R, 147 R, 169 R, 33/147 G, 163, 169, 170, 174 R, 178 R, 147 J

[56] References Cited

U.S. PATENT DOCUMENTS

| | | | |
|---|---|---|---|
| 2,216,615 | 10/1940 | Gregory | 33/147 R |
| 2,553,397 | 5/1951 | Ames | 33/147 J |
| 2,994,963 | 8/1961 | Turner | 33/172 R |
| 3,158,941 | 12/1964 | Komstadius | 33/143 K |
| 3,781,999 | 1/1974 | Colangelo | 33/172 R |

FOREIGN PATENT DOCUMENTS 1041516 10/1953 France ........................ 33/170

*Primary Examiner*—Willis Little
*Attorney, Agent, or Firm*—Wegner, Stellman, McCord, Wiles & Wood

[57] ABSTRACT

A measuring and gauging instrument has a column secured to a base, a carrier adjustably movable along the column to a selected position and releasably mounting a selected anvil thereon, and a dial indicator mounted on a support adjustably movable to a selected position relative to the column. The dial indicator provides a relative measurement of a workpiece supported by the anvil and engaged by the dial indicator and, depending on the particular configuration of the anvil employed, gives an indication of workpiece diameters, groove depths, bore and slot locations, or the like.

11 Claims, 4 Drawing Figures

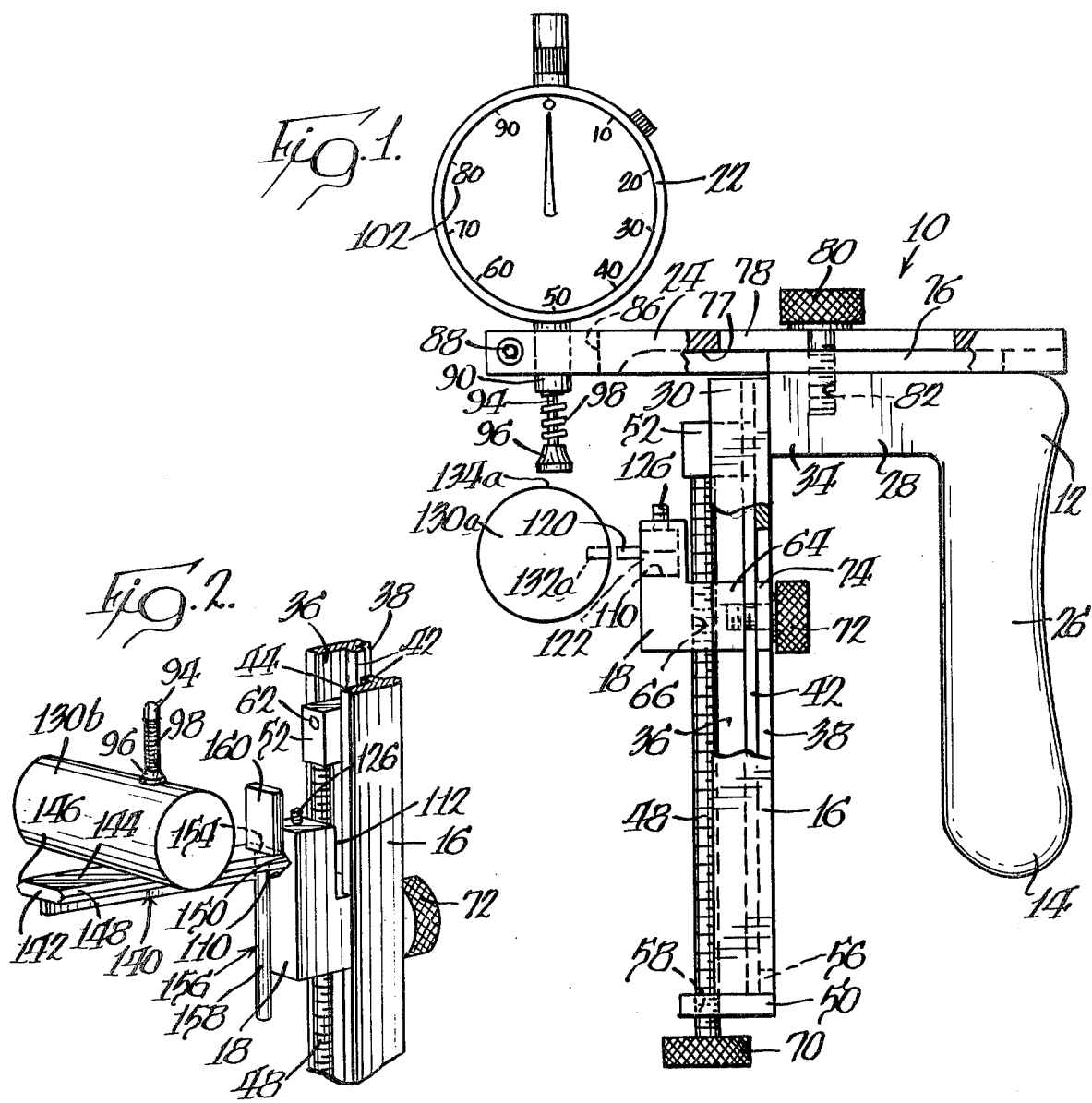
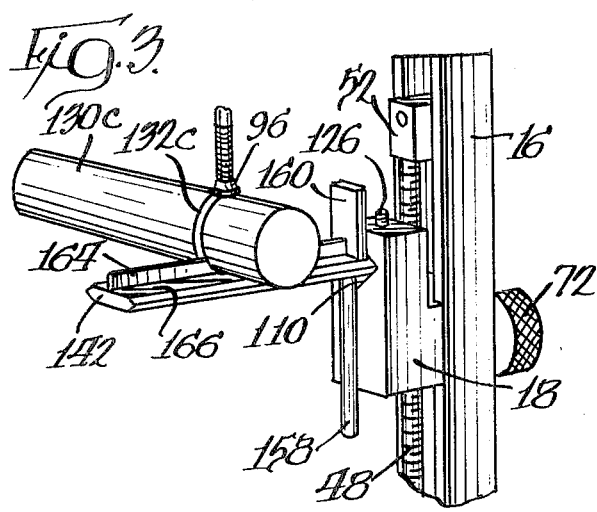
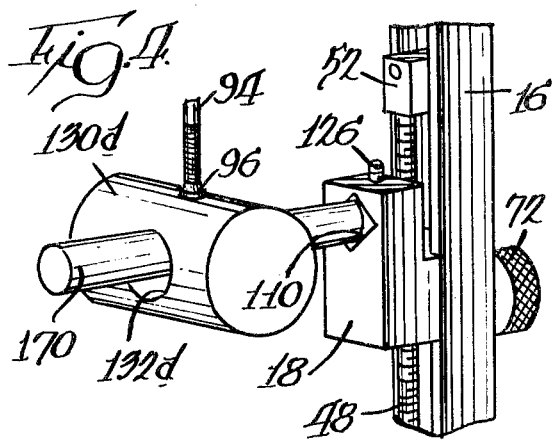

KEYWAY GAUGE

BACKGROUND OF THE INVENTION

1. Field of the Invention

This invention relates generally to measuring and gauging instruments and, more particularly, to a hand-held instrument adapted for gauging, in addition to the diameter of a workpiece, keyway slot locations, groove depths and cross hole locations.

2. Description of the Prior Art

In the prior art, various gauges and instruments have been utilized to measure and inspect a workpiece for proper size and dimension. Devices which are capable of measuring the diameter of a workpiece, which may be round, rectangular or square, the depth of workpiece grooves, and the location of keyway slots and cross holes have been very expensive and complex and relatively cumbersome in use.

SUMMARY OF THE INVENTION

It is a principal object of the present invention to provide a hand-held measuring and gauging instrument which may be easily set up to check dimensions of workpieces of various sizes and configurations. The instrument is operative to verify tolerances with respect to the external diameter of a workpiece, the location of a keyway slot on the exterior of a workpiece, the depth of a groove or an undercut in the workpiece, or the location of a cross hole and the wall thickness of such a cross hole.

In accordance with the invention, the instrument includes a base member having handle and column portions, a carrier mounted to the column portion and releasably secured at a selected position therealong, an interchangeable anvil carried by the carrier, a support member, and a dial indicator carried by the support member having a probe for actuating the indicator to provide a relative measurement of a workpiece placed on the anvil under the probe.

In an examplary embodiment of the invention, elements are provided for adjustably setting the relative positions of the carrier and the support member to position the anvil and the probe according to the size and configuration of the workpiece to be measured. Herein, the carrier is mounted on a threaded shaft for movement therealong when the shaft is rotated to provide an adjustment for workpiece height and is clamped in selected position by a manually operated thumbscrew. The support member is secured to the base member by a thumbscrew which when released permits movement of the support member relative to the base member to provide an adjustment for workpiece width.

In a preferred embodiment of the invention, the carrier includes a socket into which an anvil of selected configuration may be positioned and fixedly secured in place. The anvil has a mounting portion configured to fit within the socket and further may comprise a Woodruff key used in gauging keyway slot locations, may comprise a dowel used in gauging cross hole locations and wall thicknesses, or may comprise a fixture having a flat shelf surface to support a workpiece for gauging external diameter and a projection on the reverse side for gauging groove depths when the fixture is rotated 180 degrees in the carrier socket.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational view of our improved keyway gauge with parts broken away;

FIG. 2 is a perspective view of the carrier and column supporting a workpiece for gauging;

FIG. 3 is a perspective view similar to FIG. 2 only having a different configured support bar for the workpiece; and, FIG. 4 is a perspective view similar to FIG. 2 only having a dowel on the carrier for use in gauging cross holes.

BRIEF DESCRIPTION OF THE PREFERRED EMBODIMENTS

Referring to the drawings, numeral 10 broadly designates a measuring and gauging instrument constructed in accordance with the present invention. While references to specific orientations and directions are used to facilitate description of the instrument herein, they are not to be construed as limitations of the invention.

The instrument 10 includes a base 12 having a handle portion 14 and a column portion 16, a carrier 18 adjustably secured to the column portion 16 for mounting an anvil, the details of which will be described hereafter, and a dial indicator 22 carried by a support bar 24.

The handle portion 14 is L-shaped and has a rearward pistol-type handgrip segment 26 and a forwardly extending upper mounting segment 28. The column portion 16 has an upper end 30 which is secured by suitable means, such as an Allen head screw (not shown), to the forward end 34 of the handle portion 14 such that the column portion 16 is spaced from the handgrip segment 26. The column portion 16 defines an elongate open front groove 36 and an elongate open rear groove 38 which are separated by a wall 42 having an elongate slot 44 therethrough for a purpose to be described hereafter. Both grooves 36 and 38 are disposed parallel to a longitudinal axis defined by the column portion 16.

Located forwardly of the groove 36 is a threaded shaft 48 which is journalled for rotation at its lower end by a bracket 50 and at its upper end by a block 52. The bracket 50 is secured to the bottom of the column as by an Allen head screw (not shown) and closes the bottom of the grooves 36 and 38. The bracket 50 has a finger 56 extending upwardly into the open lower rear end of the groove 38 to properly locate the bracket 50. The threaded shaft 48 extends through a bore 58 defined in a forward portion of the bracket 50. The block 52 is fixed to the column portion 16 within the groove 36 by an Allen head screw 62 threaded into the wall 42.

The carrier 18 has a tongue 64 which extends rearwardly into the groove 36 and is of a size and configuration similar thereto. The carrier 18 is mounted upon the threaded shaft 48 via a threaded bore 66 for linear movement therealong parallel to the column axis in response to rotation of the shaft 48. The threaded shaft 48 is provided with a knurled thumb knob 70 at the lower end thereof for manual manipulation. When the threaded shaft 48 is rotated on its elongate axis, the carrier 18 travels along the shaft with the tongue 64 moving within the groove 36. A knurled-head thumbscrew 72, which extends through the slot 44 defined in the bottom of the groove 36 and a spacer 74 slidable in the rear groove 38, is threaded into the tongue 64 of the carrier 18. The thumbscrew 72 may be suitably tightened by an operator to fixedly clamp the column portion 16 between the carrier 18 and the head of the thumbscrew 72 thereby anchoring the carrier 18 in selected position. Loosening of the thumbscrew 72 permits movement of the carrier 18 and thus rotation of the threaded shaft 48.

The support bar 24 is releasably secured against a raised rib 76 extending upwardly from the handle portion 14 by way of a knurled-head thumbscrew 80. The rib 76 nests in an elongate slot 77 in the undersurface of the support bar 24. The thumbscrew 80 extends through an elongate slot 78 defined in the support bar 24 and is threaded into a bore 82 located in the top of the handle portion 14. When tightened, the head of the thumbscrew 80 bears against the support bar 24 to clamp the bar in selected position. When the thumbscrew 80 is loosened, the support bar 24 may be selectively moved by an operator forwardly or rearwardly in a direction perpendicular to the column axis. The support bar 24 extends transversely to the column portion 16 and has a forward bifurcated end 86 which extends above the carrier 18 and supports the dial indicator 22. The bifurcated end 86 defines an enlarged clamping area so that an Allen head screw 88 may be tightened down to clamp the cylindrical sleeve 90 of the dial indicator 22 between the split ends of the support bar 24. The dial indicator 22 may be raised or lowered to a desired height by releasing the screw 88.

A plunger 94 has a contact point 96 defining a probe for the dial indicator 22. The plunger 94 extends through the sleeve 90 and is biased by a spring 98. The contact point may either be flat, as shown, or be a pyramid shape. The dial indicator 22 is of a commercially available construction and the indicator used herein has a range of 0.250 inch. The dial indicator 22 includes a dial 102 for visual identification in 0.001 inch gradations of the distance which the plunger 94 may be moved into the indicator. It is, of course, understood that other types of indicators can be employed.

It is seen from the drawings that the carrier 18 has a mounting socket 110 defined therein having a square cross-sectional configuration. The rear portion of the carrier 18 is cutaway at 112 to permit movement of the socket portion thereof over the shaft block 52 to position an anvil as described below immediately adjacent the contact point 96, if desired. The side walls of the mounting socket 110 have an angular orientation relative to vertical of 45 degrees. As should become apparent, the socket 110 provides a convenient means for facilitating the interchanging of the various anvils which may be utilized with the instrument.

While FIGS. 2-4 illustrate various types of anvils which might be employed with the gauging instrument 10, for purposes of brevity and clarity, initially only FIG. 1 will be described.

In FIG. 1, a Woodruff key 120 has a mounting portion 122 of square cross section which is inserted into the socket 110. The mounting portion 122 is of a size and configuration corresponding to that of the socket 110 so that a good fit is made therebetween. In any event, an Allen head set screw 126 threaded into the top of the carrier 18 may be tightened so as to extend into the socket 110 and engage the mounting portion 122 to releasably clamp the Woodruff key 120 in fixed position.

In operation, the size of the Woodruff key 120 utilized is selected in accordance with the workpiece, an example of which is shown and designated 130a, and the size of the keyway slot 132a defined therein. The vertical position of the carrier 18 along the column portion 16 and the horizontal position of the indicator plunger 94 are then selected by the operator such that the plunger 94 will be properly positioned relative to the workpiece 130a and the measurement taken will be within the range of the dial indicator 22. The location of the keyway slot 132a may then be inspected by moving the slot onto the Woodruff key 120 to cause the contact point 96 of the plunger 94 to engage the external surface 134a of the workpiece 130a. The workpiece will then be lightly clamped between the plunger 94 and the Woodruff key 120. The indicator dial 102 may then be visually examined by noting the reading thereon. By comparing this measurement with a fixed norm, the accuracy of the location of the keyway slot 132a may be noted. The workpiece may be round, flat or rectangular for this type of measurement. It is understood that the position of the anvil is modified in accordance with the size of the workpiece such that the measurement will be within the range of the indicator 22.

In FIG. 2, the anvil is a jig fixture, generally designated 140, and is defined by an elongate bar 142 having a generally flat hexagonal cross-sectional configuration with a flat shelf surface 144, lateral edges 146 and 148 defined by intersecting beveled surfaces at the top and bottom, and a mounting portion 150 at one end of square cross section. The mounting portion 150 has a configuration and size corresponding to that of the socket 110 so that a snug fit is achieved between the fixture 140 and the socket 110 when the fixture 140 is inserted therein. The fixture 140 may be fixedly secured by tightening the set screw 126 thereagainst.

The bar 142 has a bore 154 adjacent the mounting portion 150 for receiving a pin, generally designated 156. The pin 156 includes a dowel portion 158 which is inserted through the bore 154 and an enlarged flat abutment portion 160 to prevent the pin 156 from passing completely through the bore 154 and to act as lateral positioning surface against which a workpiece may bear during measurement thereof for proper alignment relative to the plunger 94. When a measurement is taken, the workpiece 130b will be lightly clamped between the shelf surface 144 and the plunger 94 by the action of the spring 98 of the dial indicator 22.

Referring to FIG. 3, the bar 142 is shown in a reversed position rotated 180 degrees from FIG. 2 so as to provide means for checking the depth of grooves and undercuts in a workpiece 130c. In FIG. 3, a thin, elongate projection 164 is clearly seen extending outward from the flat surface 166 of the bar 142. The projection 164 is of a dimension such that the depth of the groove 132c is less than the height of the projection 164 so that a workpiece 130c is less than the height of the projection 164 so that a workpiece 130c placed on the projection 164 with the groove 132c aligned therewith will rest on the projection 164 rather than on the flat surrounding surface 166 thereby permitting measurement of the groove depth.

The bar 142 can be machined from a square bar so that one corner is cut away to define the shelf surface and the opposite corner is cut away to leave the projection extending upright from the surrounding flat surface.

It is also conceived that the bar 142 may be positioned within the socket 110 at an orientation which is vertical, i.e., rotated 90 degrees from that shown in FIG. 2 or 3, thereby allowing measurement of relatively wide, deep grooves or channels.

In FIG. 4, a pin dowel 170 is inserted into the socket 110 and is secured fixedly by the set screw 126. As illustrated, the dowel 170 is inserted through a cross hole 132d in the workpiece 130d so as to permit the gauging of center holes, off-centered holes and wall thicknesses. While the dowel 170, shown herein, is of a diameter relative to the socket 110 to provide a snug fit, the dowel employed may have a much smaller diameter to permit insertion thereof into very small cross holes of a workpiece. In this event, the set screw 126 is effective in holding the dowel at the bottom of the socket 110. Such an anvil configuration then may be used to inspect hole locations on most geometric shapes, including round and flat workpieces.

We claim:

1. A measuring and gauging instrument comprising:
a base member carrying a column;
an anvil member;
a carrier mounted to said column for movement to an infinite number of positions along the column and having means for fixing said carrier in a selected one of said positions;
means for releasably mounting said anvil member to said carrier so that said anvil member extends outwardly therefrom;
said carrier has a socket formed therein adapted to receive an end of said anvil member;
said socket has a square cross-sectional configuration and has sides angularly oriented 45 degrees from the axis of the column;
support means carried by said base member;
means for mounting said support means along an axis transverse to the axis of the column;
indicator means carried by said support means and having a probe extending toward said anvil member; and
a dial connected with said probe for providing visual identification of the amount of movement of said probe, whereby a workpiece positioned on said anvil member is engaged by said probe for measuring a selected dimension of the workpiece.

2. The measuring and gauging instrument of claim 1 wherein said anvil member is a Woodruff key, whereby the location of a keyway slot in the workpiece may be gauged.

3. The measuring and gauging instrument of claim 1 wherein said anvil member is a bar having a flat surface, whereby the diameter of the workpiece may be gauged.

4. The measuring and gauging instrument of claim 1 further including means for releasably fixing the end of said anvil member in said socket.

5. A measuring and gauging instrument comprising:
a base member carrying a column;
an anvil member;
a carrier mounted to said column for movement to an infinite number of positions along the column and having means for fixing said carrier in a selected one of said positions;
means for releasably mounting said anvil member to said carrier so that said anvil member extends outwardly therefrom;
said anvil member is an insertion member adapted to be fit within a groove in the workpiece;
support means carried by said base member;
means for mounting said support means along an axis transverse to the axis of the column;
indicator means carried by said support means and having a probe extending toward said anvil member; and
a dial connected with said probe for providing visual identification of the amount of movement of said probe, whereby the depth of the groove in the workpiece may be gauged.

6. A measuring and gauging instrument comprising:
a base member carrying a column;
an anvil member;
a carrier mounted to said column for movement to an infinite number of positions along the column and having means for fixing said carrier in a selected one of said positions;
means for releasably mounting said anvil member to said carrier so that said anvil member extends outwardly therefrom;
said anvil member is a dowel insertable into a cross hole in the workpiece;
support means carried by said base member;
means for mounting said support means along an axis transverse to the axis of the column;
indicator means carried by said support means and having a probe extending toward said anvil member; and
a dial connected with said probe for providing visual identification of the amount of movement of said probe, whereby the position of the cross hole relative to the external surface of the workpiece may be gauged.

7. A measuring and gauging instrument comprising:
a base member carrying a column;
an anvil member;
a carrier mounted to said column for movement to an infinite number of positions along the column and having means for fixing said carrier in a selected one of said positions;
means for releasably mounting said anvil member to said carrier so that said anvil member extends outwardly therefrom;
said carrier has a socket formed therein adapted to receive an end of said anvil member;
support means carried by said base member;
means for mounting said support means along an axis transverse to the axis of the column;
indicator means carried by said support means and having a probe extending toward said anvil member;
said anvil member is a bar having a flat surface and a mounting portion at one end with a square cross-sectional configuration and a size such that the bar may be inserted within said socket with said flat surface presented to the indicator;
a dial connected with said probe for providing visual identification of the amount of movement of said probe; and
said bar has a projection extending from the side of the bar opposite said flat surface and adapted to fit within a groove of a workpiece, whereby said bar may be inserted into said socket to present said flat surface to the indicator or to present the projection to the indicator so as to allow measurement of the groove depth.

8. The measuring and gauging instrument of claim 7 wherein a bore is defined adjacent the end of said bar inserted into said socket and further including a dowel pin insertable into said bore to define a positioning abutment against which the workpiece may bear.

9. A gauging instrument comprising:

a base having a handgrip;

a column secured to said base and having a longitudinal axis;

an indicator having a probe extending therefrom adapted to actuate said indicator to provide visual identification of the amount of movement of said probe in a direction generally parallel to the column axis;

a support for mounting said indicator;

means for mounting said support to said base for adjustable movement transverse to the column axis to plural positions and fixing said support in selected position;

an anvil positioned below said probe;

a carrier having means for releasably mounting said anvil to said carrier to permit changing of the anvil;

said last-named means comprising a socket into which the anvil is inserted, said socket having a square cross-sectional configuration slanted 45 degrees relative to the orientation of said probe; and, means for mounting said carrier to said column for adjustable movement to plural positions toward and away from said probe in a direction generally parallel to the column axis and fixing said carrier in a selected position, whereby a workpiece positioned on said anvil is engaged by said probe to provide a relative measurement on the indicator of a selected dimension of the workpiece.

10. The gauging instrument of claim 9 wherein said column carries a threaded shaft and said carrier is threaded on said threaded shaft for linear movement therealong when the shaft is rotated.

11. A gauging instrument comprising:

a base having a handgrip;

a column secured to said base and having a longitudinal axis;

an indicator having a probe extending therefrom adapted to actuate said indicator to provide visual identification of the amount of movement of said probe in a direction generally parallel to the column axis;

a support for mounting said indicator;

means for mounting said support to said base for adjustable movement transverse to the column axis to plural positions and fixing said support in a selected position;

an anvil positioned below said probe;

said anvil having a flat surface on one side thereof and an upright projection on the opposite side;

a carrier having means for releasably mounting said anvil to said carrier to permit changing of the anvil; and, means for mounting said carrier to said column for adjustable movement to plural positions toward and away from said probe in a direction generally parallel to the column axis and fixing said carrier in a selected position, whereby the flat surface on the anvil may be utilized to gauge workpiece diameters and the projection on the anvil may be utilized to gauge workpiece groove depths.

* * * * *